United States Patent [19]

Wöhrl et al.

[11] Patent Number: 4,679,619

[45] Date of Patent: Jul. 14, 1987

[54] HEAT EXCHANGERS HAVING A TUBE MATRIX IN A HOUSING

[75] Inventors: Bernhard Wöhrl, Gauting; Alfred Jabs, Gröbenzell, both of Fed. Rep. of Germany

[73] Assignee: MT Motoren-und Turbinen Union Munchen GmbH, Fed. Rep. of Germany

[21] Appl. No.: 853,468

[22] Filed: Apr. 18, 1986

[30] Foreign Application Priority Data

Apr. 20, 1985 [DE] Fed. Rep. of Germany ....... 3514377

[51] Int. Cl.$^4$ .......................... F28D 7/06; F28F 9/22
[52] U.S. Cl. ..................................... 165/81; 165/159
[58] Field of Search .................................. 165/81, 159

[56] References Cited

U.S. PATENT DOCUMENTS

| | | | |
|---|---|---|---|
| 1,884,555 | 10/1932 | Brown | 165/81 X |
| 1,943,456 | 1/1934 | Potter | 165/81 X |
| 4,036,293 | 7/1977 | Tank et al. | 165/81 X |

FOREIGN PATENT DOCUMENTS

| | | | |
|---|---|---|---|
| 0149767 | 7/1985 | European Pat. Off. | 165/81 |
| 490727 | 8/1938 | United Kingdom | 165/159 |
| 620097 | 3/1949 | United Kingdom | 165/159 |
| 515024 | 6/1976 | U.S.S.R. | 165/159 |

*Primary Examiner*—Albert W. Davis, Jr.
*Assistant Examiner*—Randolph A. Smith
*Attorney, Agent, or Firm*—Roberts, Spiecens & Cohen

[57] ABSTRACT

A heat exchanger comprising a plurality of spaced U-shaped tubes arranged in a matrix and disposed in a housing for the flow of hot gases around the tubes for heat exchange with a fluid conveyed in the tubes. The housing has a well surrounding the curved U-portions of the tubes of the matrix in spaced relation a shell is diposed between the wall and the curved U-portions of the tubes of the matrix. A flexible seal is mounted between the wall and the shell for preventing flow of hot gases therebetween, and at least one brush seal is mounted between the shell and the curved U-portions of the tubes of the matrix for blocking passage of hot gases therebetween. The brush seal comprises a plurality of bristles clamped at one end in a recess in the shell and fanning out towards the other free end to tangentially and sealingly contact the outermost row of the tubes of the matrix.

15 Claims, 10 Drawing Figures

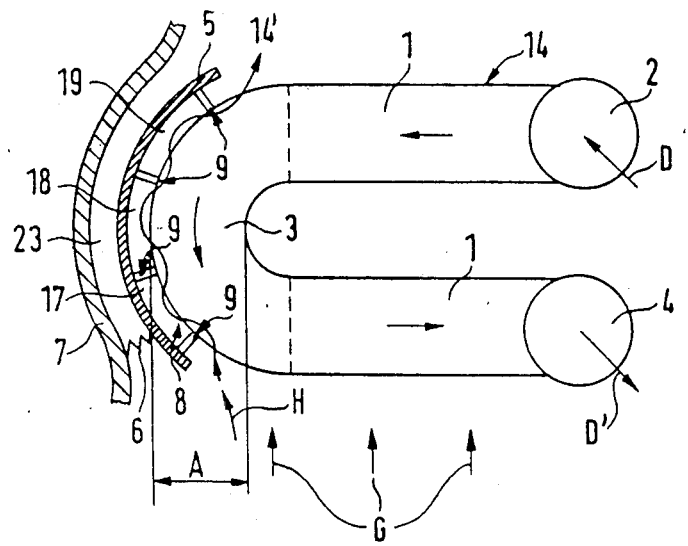
FIG. 1
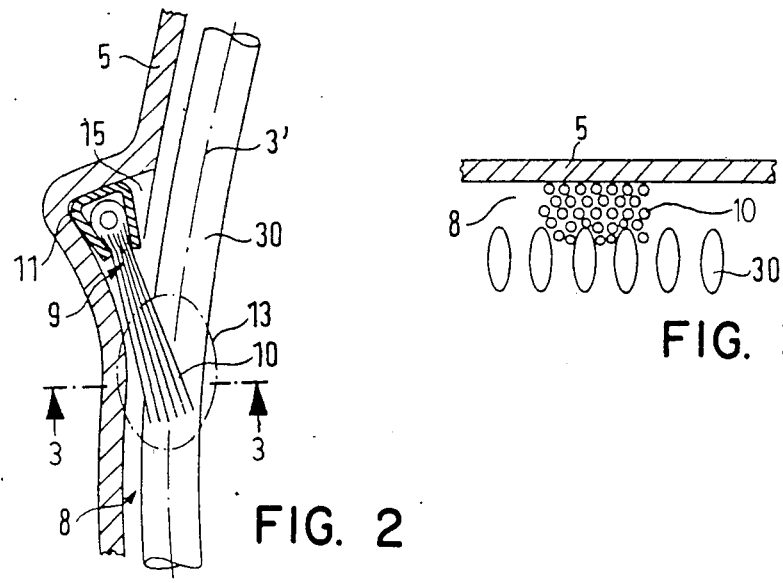
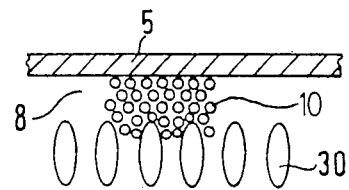
FIG. 3
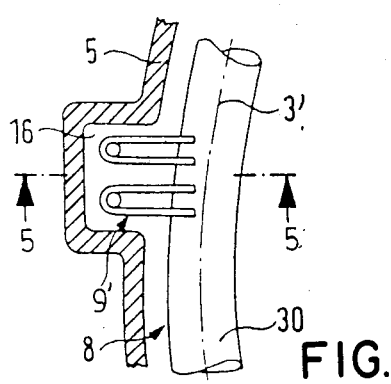
FIG. 2
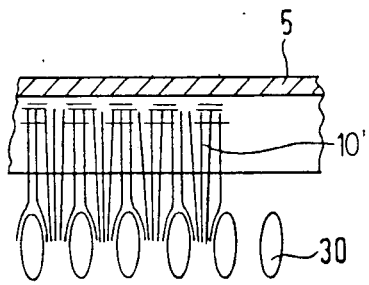
FIG. 4  FIG. 5

HEAT EXCHANGERS HAVING A TUBE MATRIX IN A HOUSING

FIELD OF THE INVENTION

The invention relates to improvements in heat exchangers and more particularly to heat exchangers of the type having a plurality of spaced U-shaped tubes arranged in a matrix and disposed in a housing in which hot gases flow around the tubes for heat exchange with a fluid conveyed in the tubes, said housing having a wall surrounding the curved U-portions of the tubes of the matrix in spaced relation.

PRIOR ART

Heat exchangers of this type, are disclosed, for example, in U.S. Pat. No. 4,475,586 where there is shown a cover or guide wall around the bend portions of the tubes of the matrix. Conventionally, the cover walls are constructed as metal vanes conforming to the curved outer contour of the tube bends where the fluid in the tubes undergoes reversal. Since the guide wall forms a portion of the casing or housing structure enveloping the tube matrix of the heat exchanger whose temperature and expansion differ from that of the tube matrix, such a construction makes it necessary to provide a suitable spacing or gap between the metal vanes and the bends of the tubes of the matrix, so that the tubes are freely displaceable.

As a consequence, the hot gases flowing around the tube matrix can have a relatively large leakage flow in the gap. This produces two notable disadvantages impairing the effectivity of the heat exchanger.

One is the hot gas leakage flow does not participate in the heat exchange process, and two is that at the outlet of the gap, the leakage flow is discharged at a relatively high velocity into the main gas flow through the matrix, causing turbulence and severe irregularities of flow. Together, these disadvantages are the cause of a relatively severe reduction in heat exchange efficiency.

In another heat exchanger disclosed in U.S. Pat. No. 3,746,083 the wall around the bends of the tubes forms a fixed part of the casing carrying the hot gases and is directly supported by thrust elements on the bends of the tubes to bridge the gap between the wall and the tube bends. While this construction operates to partially seal the outer hot gas leakage gap, it also causes an undefined heat exchange process in the area of the tube bends. A hot gas flow carried homogenously along the outer surfaces of the tube bends therefore is not ensured. Moreover, there is no consideration of the thermally produced differential expansions in the area between the tube bends themselves and between the tube matrix and the casing or guide wall. In the prior art as described above, operationally induced relative movement of the tube matrix causing tube vibrations and deflection are not considered and no construction is disclosed for compensating such relative movements of the tube matrix while damping its vibrations.

SUMMARY OF THE INVENTION

It is an object of the present invention to provide improvements in a heat exchanger such that the disadvantages described above are eliminated and relative movements of the various tubes of the matrix with respect to one another as well as with respect to the housing wall surrounding the matrix are accommodated and optimum heat exchange is obtained in the region around the curved U-portions of the tubes of the matrix.

In accordance with the above and further objects of the invention, a shell is disposed between the housing wall and the curved U-portions of the tubes of the matrix, a flexible seal is mounted between the wall and the shell for preventing flow of hot gases therebetween and at least one brush seal is mounted between the shell and the curved U-portions of the tubes of the matrix for blocking passage therebetween.

In a particular embodiment of the invention, a plurality of brush seals are disposed in spaced relation around the curved portion of the tubes of the matrix to form compartments between adjacent brush seals which are open into the matrix whereby the hot gases flowing at the periphery of the curved U-portion of the tubes of the matrix undergo undulating or zig zag travel to provide a combination of cross flow and counter flow heat exchange in this region.

In accordance with a preferred embodiment, each brush seal comprises a plurality of bristles which are clamped together at one end so that the bristles fan out towards the other end. The bristles tangentially contact the outermost row of tubes of the matrix at their curved U-portions to fill the space or cavity between the shell and the tubes in order to provide the seal which prevents flow of hot gases.

It is the combination of the brush seal with the flexible seal between the wall and the shell which provides for blockage of the leakage path of the hot gases within the housing wall and constrains the hot gases to flow around the periphery of the curved portion of the tube matrix within the confines of the shell.

The construction according to the invention makes it possible to compensate for relative movements of the curved U-portions of the tubes of the matrix caused by differing temperatures, vibrations or elastic deflections, while positively sealing undesirable leakage gap of hot gases and improving the heat exchange in the curved portion of the tube matrix.

By virtue of the construction of the invention in which the shell covers a substantial part of the curved portion of the tube matrix, the hot gases primarily contact the substantially straight part of the tube matrix. The portion of the hot gases flowing into the shell can be made to undergo combined crossflow counterflow heat exchange with at least the curved portions of the outer tubes of the matrix such that the heat exchange efficiency is improved over the prior art.

BRIEF DESCRIPTION OF THE FIGURES OF THE DRAWING

FIG. 1 is a diagrammatic front view of a portion of a heat exchanger in which the casing and shell portions are shown in section.

FIG. 2 is a longitudinal sectional view, on enlarged scale, of a part of the shell and a brush seal shown with a part of a tube of the matrix of the heat exchanger.

FIG. 3 is a sectional view on line 3—3 in FIG. 2.

FIG. 4 is a longitudinal sectional view, similar to FIG. 2, of another embodiment of the brush seal.

FIG. 5 is a sectional view taken on line 5—5 in FIG. 4.

DETAILED DESCRIPTION OF PREFERRED EMBODIMENTS OF THE INVENTION

Figure 6:
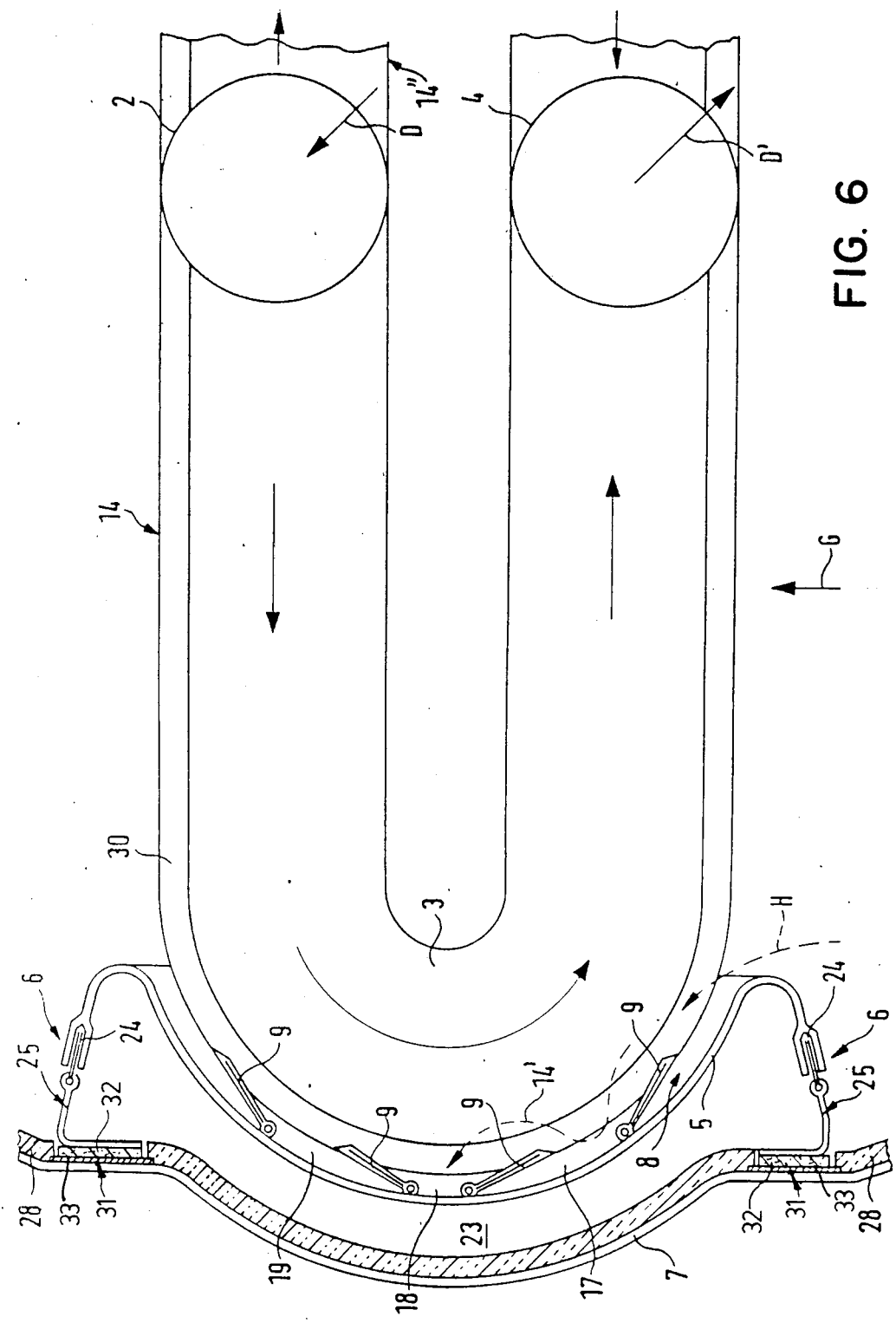
FIG. 6 is a view similar to FIG. 1, on enlarged scale, and showing the seals in greater detail.

In FIG. 1 there is diagrammatically shown a heat exchanger which comprises an assembly or matrix 14 of heat exchanger tubes 1 of U-shape which are positioned within a housing including a wall 7 such that heated gases G can flow across the tube matrix 14 in the direction of the arrow from an inlet region in the housing below the matrix in FIG. 1 to an outlet region in the housing above the matrix in FIG. 1. The tubes 1 of the matrix 14 are arranged in spaced relation in rows and columns and a part of the outer row of the matrix is shown in FIG. 3.

The U-shaped tubes 1 of the matrix 14 have straight legs respectively connected to inlet and outlet ducts 2, 4. The ducts 2 and 4 extend substantially parallel to one another in a direction perpendicular to the flow of gases G. The matrix 14 projects transversely from the ducts and extends along the length of the ducts. An operating fluid, such as compressed air, is supplied to the tubes 1 of the matrix 14 at D at duct 2 and the operating fluid flows through the interior of the tubes and is discharged at D' from duct 4 for supply to a utilization means such as the combustion chamber of a gas turbine engine. The hot gas flow G may be, for instance, the exhaust gas flow of the gas turbine engine and in the heat exchange process, a portion of the heat contained in the exhaust gases of the engine can be recovered for the working cycle of the engine. In the course of travel of the compressed air through the tubes 1, the compressed air is heated by the gases G flowing around the exterior of the tubes so that the compressed air supplied to duct 4 from the tubes 1 is heated.

The U-shaped tubes 1 have curved U-portions 3 connected to the straight legs and the compressed air flowing in the tubes undergoes reversal of direction in the curved U-portions. The curved U-portions of the tubes are surrounded by wall 7 of the housing. In the region of the straight legs of the tubes of the matrix, the flow losses are minimal and heat exchange is at maximum whereas at the curved U-portions a leakage flow can take place between the housing and the outer row of the tubes of the matrix which does not participate in the heat exchange process. In order to avoid the leakage flow and maximize the flow of the hot gases over the straight legs of the tubes of the matrix, a shell 5 covers the curved portion 3 over about 30 to 70% of its area A. The shell 5 is connected to wall 7 of the heat exchanger housing by a flexible seal 6.

A portion H of the hot gas flow will seek the path of least resistance through the curved portion 3, especially through the intermediate space or cavities between the outer row 30 of the tubes and the shell 5. The intermediate space 8 is sealed by a plurality of seals 9 such that differential relative expansions between the tubes 1 of the matrix 14 in the curved portions 3 and the shell 5 are not interfered with. For this purpose, the seal 9 is advantageously constructed as a brush seal.

The invention contemplates that the brush seal completely fills the cavities 8 between the outer row 30 of the tubes and the shell 5. In accordance with one embodiment of the invention as shown in FIGS. 2 and 3, the brush seal 9 comprises a plurality of flexible bristles or filaments 10 which are clamped at one end in a clamp support 11 in order to fan out at their opposite free ends. The brush seal 9 forms an acute angle with the axis 3' of the tubes 30 in the curved U-portions 3. The bristles 10 are formed of a highly heat resistant wire whose ends tangentially contact the tubes in a tangential contact zone 13 and due to the spread of the bristles 10 then completely fill the cavities 8 between the tubes 30 themselves and between the tubes 30 and the shell 5. This arrangement provides the advantage that the bristles 10 have sufficient flexible length between the fixed support 11 and the tangential contact zone 13 of the tubes 30 to compensate for relative movements and deflections of the tube matrix 14 due to vibrations. This arrangement provides a minimum free passage area for the hot gas flow.

In the embodiment shown in FIGS. 4 and 5 the brush seals 9' including bristles 10' thereof are arranged at right angles to the tube axis 3'. In the embodiment in FIG. 2, the clamp support 11 is secured in a recess 15 in shell 5 whereas in FIG. 4 two brushes are secured in a recess 16 in the shell 5.

In FIG. 1, a plurality of spaced brush seals 9 are arranged around the tubes of the matrix in the curved portion 3 to form individual compartments 17, 18, 19 which open towards the tubes 30 of the matrix and the portion H of the hot gases at the curved portion 3 of the matrix is constrained to flow around the tubes 30 in the outer rows in an undulating or zig-zag path 14'. This not only improves the sealing effect but also the heat exchange in the curved portion 3 since a combination of cross flow and counter flow heat exchange takes place.

Figure 7:
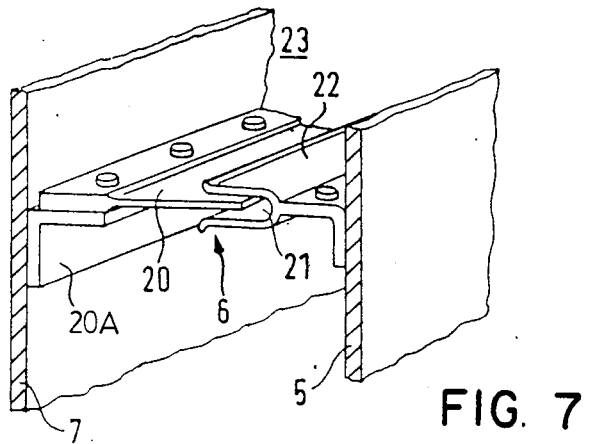
FIG. 7 is a perspective view of one embodiment of a seal which can be utilized in the heat exchanger in FIG. 6.
Figure 8:
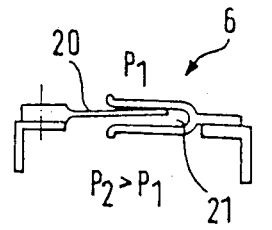
FIG. 8 is an end view of the seal in FIG. 7.

The seal 6 between the shell 5 and the wall 7 can be constructed as a differential pressure seal to compensate for relative movements in all directions between shell 5 and wall 7. FIGS. 7 and 8 show such a seal and therein for purposes of simplification the shell 5 and wall 7 are shown as flat plates. The seal 6 comprises a flexible thin sheet metal strip or foil 20 attached to the wall 7 by an angle member 20A. The strip 20 engages with axial and radial play in a space 21 between the legs of a fork 22 secured to plate 5. The strip 20 engages one or the other of the legs of the fork 22 in accordance with prevailing pressure conditions. In FIG. 8 the strip 20 engages the upper leg of fork 22 due to pressure $P_2$ which is greater than pressure $P_1$. Namely, the differential pressure $\Delta p$ between pressure $P_2$ and $P_1$ respectively prevailing in the hot gas flow G and the intermediate space 23 between wall 7 and shell 5 can be utilized to assist in the closing of the seal 6.

Figure 9:
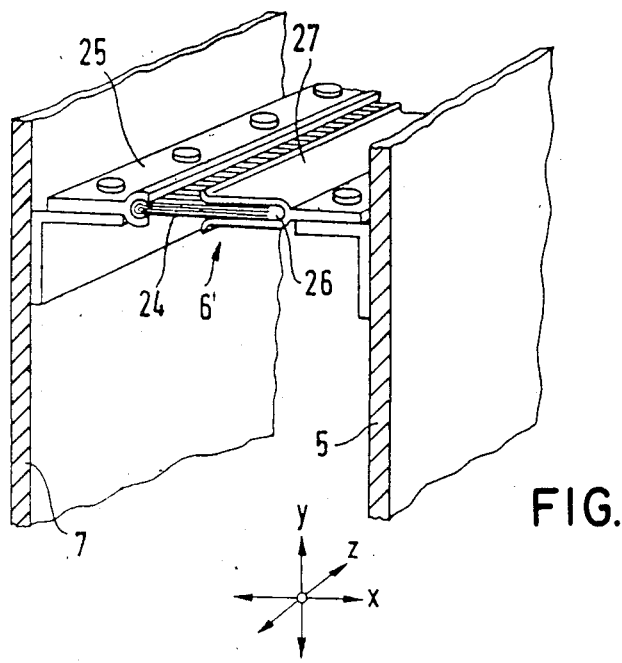
FIG. 9 is a perspective view of another embodiment of a seal which can be utilized in the heat exchanger of FIG. 6.
Figure 10:
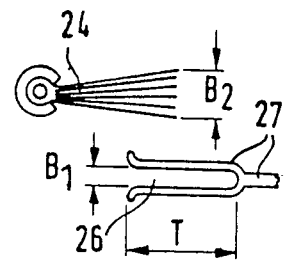
FIG. 10 is an exploded end view of the seal in FIG. 9.

In FIGS. 9 and 10 there is seen another embodiment of the seal between shell 5 and wall 7 wherein the seal is designated 6'. The seal 6' is in the form of a brush seal to accommodate all relative movement between shell 5 and wall 7 in the directions x, y, z. The seal 6' comprises a plurality of bristles 24 similar to the bristles of brush seals 9 and 9'. The bristles 24 are secured at one end in a clamp support 25 which is connected to the wall 7. The bristles 24 project from the clamp support 25 and, in free state shown in FIG. 10, fan outwardly to a width $B_2$. The free ends of the bristles project into the space 26 between the legs of a fork 27 secured to the shell 5. This is effective to accommodate relative movement of shell 5 and wall 7 in all directions. The space 26 between the legs of the fork 27 has a depth T and a width $B_1$ allowing for the requisite differential movements, the width $B_1$ being less than the width $B_2$ of the spread bristles 24 whereby the bristles are resiliently clamped between the legs of the fork 27.

The bristles or filaments 10, 10' of brush seals 9, 9' (FIGS. 1 to 5) or 24 of brush seal 6' (FIGS. 9 and 10) can be made of highly heat-resistant metallic filaments or glass filaments.

The shell 5 can form part of wall liners which enclose the matrix 14 laterally, and are secured to one or both manifolds 2, 4.

Using the same reference numerals for essentially the same functions and components as used in FIG. 1, FIG. 6 illustrates the use of the seals 6 to close off the intermediate space 23 between the shell 5 and the wall 7 of the casing both upstream and downstream relative to the hot gas flow G to force the portion H of the gases to flow within shell 5 along path 14' under the action of seals 9.

In the embodiment of FIG. 6, unlike in FIG. 1, the wall 7 is internally fitted with thermal insulation 28. At the locations where the respective support elements 25 for the brushes 24 are secured to the wall 7, a mounting unit 31 is employed separately from the insulation 28. Namely, the wall 7 is devoid of insulation 28 where units 31 are secured to the wall. Each mounting unit 31 comprises a metal felt insulation layer 32. A plate 33 is brazed to layer 32 and in turn, itself is fixedly connected to the wall 7. In this manner, thermally and mechanically ideal mounting of the support elements 25 on the wall is obtained. It is also evident in FIG. 6 that another matrix 14" can project laterally at the other side of ducts 2, 4 and a mirror image arrangement of the arrangement in FIG. 6 can be provided around the curved U-portion of matrix 14".

Numerous modifications and variations can be made of the embodiments of the invention within the scope and spirit of the invention as defined in the attached claims.

What is claimed is:

1. In a heat exchanger having a plurality of spaced U-shaped tubes arranged in a matrix and disposed in a housing for the flow of hot gases around the tubes for heat exchange with a fluid conveyed in said tubes, said housing having a wall surrounding the curved U-portions of the tubes of the matrix in spaced relation, the improvement comprising a shell disposed between the wall and the curved U-portions of the tubes of the matrix, means including a flexible seal between the wall and the shell for preventing flow of hot gases therebetween, and means including at least one brush seal between the shell and the curved U-portions of the tubes of the matrix for blocking passage therebetween of hot gases.

2. The improvement as claimed in claim 1 wherein said brush seal comprises a plurality of bristles having opposite ends, means connecting one of the ends of the bristles to said shell, the other of the ends of the bristles being free and in tangential contact with the tubes of the matrix.

3. The improvement as claimed in claim 2 wherein said bristles extend at an angle to the tubes.

4. The improvement as claimed in claim 2 wherein said bristles extend substantially perpendicularly to said tubes.

5. The improvement as claimed in claim 2 wherein said shell is provided with a recess in which said one ends of the bristles and the connecting means therefor are received.

6. The improvement as claimed in claim 2 wherein a plurality of the brush seals are disposed in spaced relation around the curved U-portion of the tubes of the matrix to form compartments between adjacent brush seals which are open into the matrix.

7. The improvement as claimed in claim 2 wherein said bristles are made of metallic or glass filaments.

8. The improvement as claimed in claim 1 wherein said flexible seal comprises a differential pressure seal.

9. The improvement as claimed in claim 8 wherein said differential pressure seal comprises a flexible strip and a fork having legs between which said strip freely extends, said strip being resiliently engaged with one of said legs due to pressure difference on opposite sides of the strip.

10. The improvement as claimed in claim 9 wherein the flexible seal is so disposed that said pressure difference is produced by the difference in pressure between the hot gases on one side of said strip and the pressure in the space between the shell and the wall.

11. The improvement as claimed in claim 1 wherein said flexible seal comprises a brush seal.

12. The improvement as claimed in claim 11 wherein said brush seal comprises a plurality of bristles having opposite ends, a clamp support at one of said ends causing the bristles to fan outwardly towards the other of the ends, and a joint defining a space into which said other ends of the bristles are inserted with resilient clamping.

13. The improvement as claimed in claim 12 wherein said space in the joint has a depth greater than the depth of insertion of said bristles whereby relative movement between the shell and the wall can be obtained towards and away from one another by axial travel of the bristles in the space.

14. The improvement as claimed in claim 12 wherein said bristles are made of metallic or glass filaments.

15. The improvement as claimed in claim 1 comprising duct means for conveying fluid to and from said tubes, and liners connected to said shell and supported by said duct means for laterally enclosing said matrix.

* * * * *